July 19, 1966 D. E. BECK 3,261,442

CAP TURNOVER DEVICE

Filed June 26, 1964 3 Sheets-Sheet 1

INVENTOR
DOUGLAS E. BECK

BY Greist, Lockwood, Greenawalt & Dewey
ATTYS.

CAP TURNOVER DEVICE

Filed June 26, 1964

INVENTOR
DOUGLAS E. BECK
BY Greist, Lockwood,
Greenawalt & Dewey
ATTYS.

INVENTOR
DOUGLAS E. BECK
BY
Griest, Lockwood,
Greenawalt & Dewey
ATTYS.

United States Patent Office 3,261,442
Patented July 19, 1966

3,261,442
CAP TURNOVER DEVICE

Douglas E. Beck, Chicago, Ill., assignor to Continental Can Company, Inc., New York, N.Y., a corporation of New York Filed June 26, 1964, Ser. No. 378,325
6 Claims. (Cl. 193—43)

This invention relates to apparatus for feeding and positioning closure caps of the kind utilized for the closing and sealing of packing vessels such as jars, bottles and the like and is more particularly concerned with improvements in cap handling apparatus of the type which will accept a line of caps in random arrangement from a hopper or the like and deliver the caps in a predetermined order to automatic container sealing machines, packing equipment or the like.

It is a general object of the present invention to provide an improved cap feeding chute for receiving a line of caps in random arrangement from a hopper or other source and for delivering the caps at a predetermined rate or at a rate automatically determined by the rapidity with which they can be accepted by a container capping machine or the like and with the caps being positioned uniformly, that is, with their tops presented upwardly and their bottoms downwardly, for application to the containers supplied to the capping machine.

It is a more specific object of the invention to provide a cap feeding chute having incorporated therein cap aligning and arranging mechanism which will retard the caps little if any as they are advanced and which will turn caps having their tops facing in the wrong direction into the opposite direction so as to arrange the caps with the tops all facing in the same direction within the chute.

It is still another object of the invention to provide an improved cap feeding chute wherein caps with the tops facing in one direction are advanced on a path straight through the chute without turning while caps with the tops facing in the opposite direction are turned in the chute while they are advancing so that all of the caps are delivered at the end of the chute with the tops facing in the same direction.

It is another object of the invention to provide a cap feeding and orienting chute which is positioned to receive the caps in the upper end in random orientation from a cap supply device, such as a hopper, which will orient the caps so as to arrange them in a uniform manner within the chute, and which will deliver the caps at the bottom of the chute with the tops thereof all facing in one direction.

These and other objects and advantages of the invention will be apparent from a consideration of the cap feeding chute which is shown by way of illustration in the accompanying drawings wherein.

Figures 1, 6, 7, 8, 9:
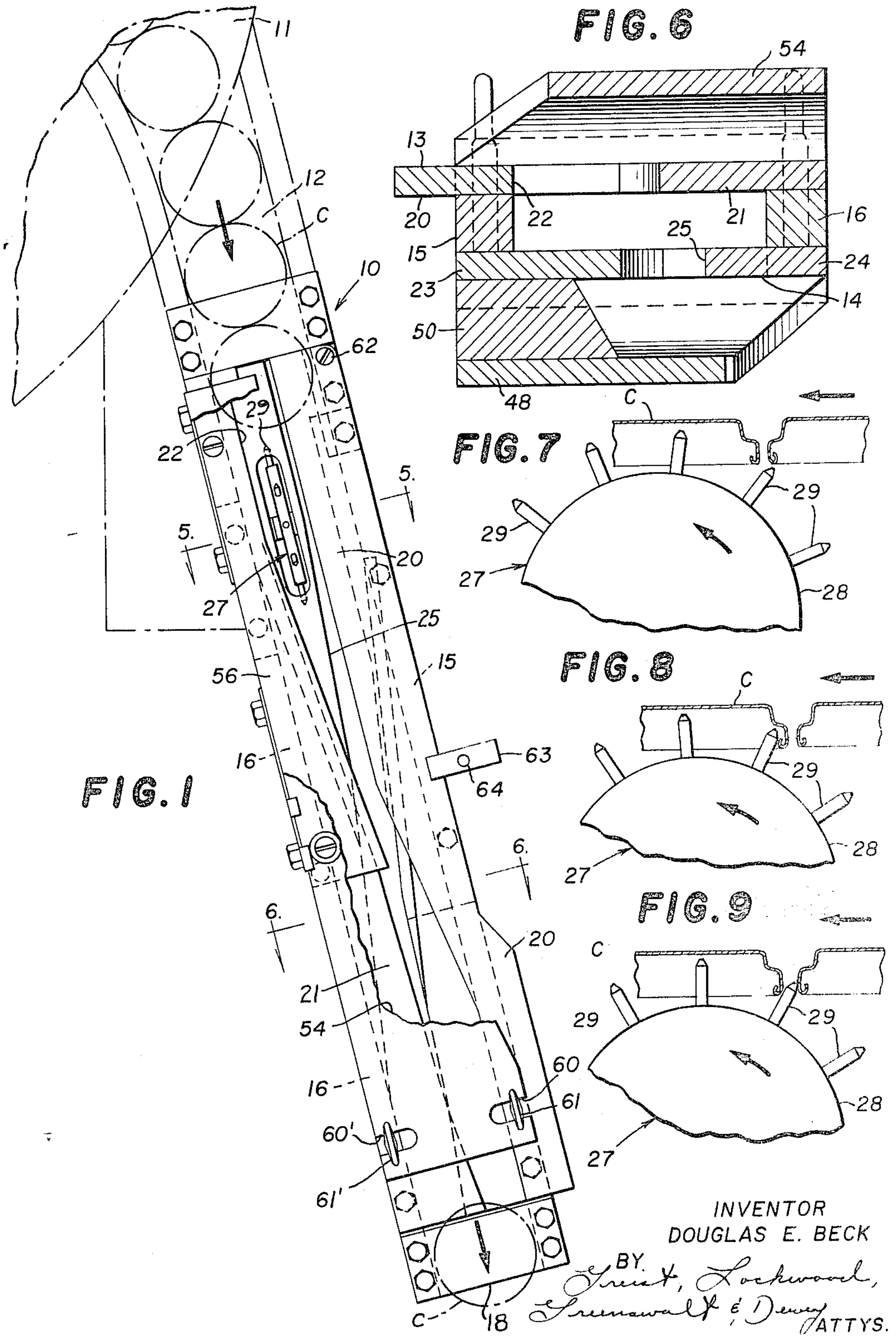
FIGURE 1 is a plan view, with portions broken away, of a cap feeding chute which incorporates therein the principal features of the present invention.
FIGURE 6 is a cross section taken on the line 6—6 of FIGURE 1, to an enlarged scale.
FIGURES 7, 8 and 9 are fragmentary schematic views illustrating different cap and pin relationships which may develop at the pin wheel during passage of caps which have their open faces on the pin wheel side of the chute.

In the operation of automatic container sealing or capping machines mechanism is required for supplying caps at a predetermined rate so as to maintain the sealing machine in continuous operation and to supply the caps in proper position for application to successive containers which are handled by the capping machine. The present apparatus is designed to accept jar or bottle caps in random arrangement from a hopper and to deliver them in proper position for application to the containers in the sealing machine. The cap feeding chute 10 which is illustrated in the drawings is particularly designed to supply the caps continuously and in a uniform manner with the tops facing in the proper direction for application to the containers and with the caps delivered by gravity at a rate determined by the speed of the capping machine.

The chute 10 is arranged in generally vertical, downwardly inclined position and is associated with a hopper, indicated at 11, in FIGURE 1, which delivers a single line of caps to the receiving area 12 at the upper end of the chute 10 with the tops of the caps in random arrangement, that is, some facing downwardly in the chute and others facing upwardly. The hopper 11, for example, may be of the type disclosed in the copending application Serial No. 365,713, filed May 7, 1964. The chute 10 comprises a top plate structure 13 and a bottom plate structure 14. The two plate structures 13 and 14 are separated by side edge forming bars or rails 15 and 16 which are in parallel spaced relation, which extend the length of the chute and which co-operate with the top and bottom plate structures 13 and 14 to define a guideway 17 in which the caps travel between the cap receiving area 12 at the upper end of the chute and a discharge opening 18 at the bottom or lowermost end of the chute 10. The normal depth of the guideway 17, which is determined by the thickness of the bars 15 and 16, is sufficient to accommodate the caps C which the chute is designed to receive when they are received in position to pass through the chute without being turned over, that is, with the top side uppermost.

Figures 2, 3:
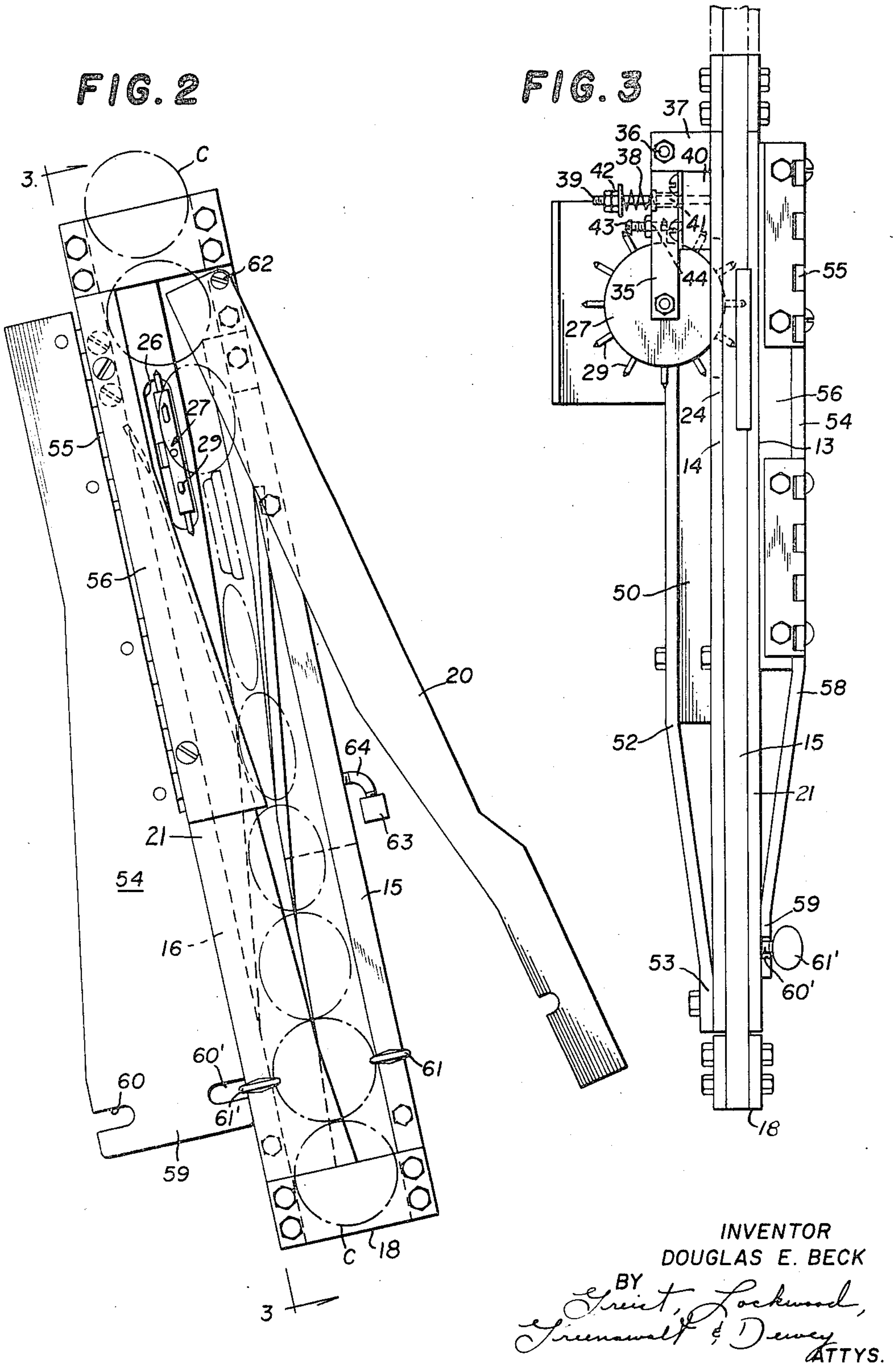
FIGURE 2 is a plan view of the chute of FIGURE 1, with certain of the chute members in a different position so that the chute is partly open.
FIGURE 3 is a side elevation of the cap feeding chute, the view being taken on line 3—3 of FIGURE 2.

The top plate structure 13 is formed by two plate sections or members 20 and 21 separated by a longitudinally extending slot 22 which permits upward movement of a portion of a cap which is required to be turned or oriented in the course of its travel through the passageway 17. The slot 22 varies in width, as shown in FIGURES 1 and 2, so as to permit the cap to move freely while it is being turned through 180°. The bottom plate structure 14 is likewise formed by two plate sections 23 and 24 separated by a longitudinally extending slot 25 which varies in width so as to permit downward movement of a portion of the opposite side of a cap C which is to be oriented while it is advanced through the passageway 17. The two slots 22 and 25 are in part laterally offset relative to each other so as to guide the cap during its rotation about a diameter thereof. The two plates 23 and 24 are fixed in position on the bottom of the chute and one bottom plate 24 is provided, near the cap entering end of the chute, with a relatively short elongate slot 26 for accommodating a pin wheel 27 which senses the position of the caps as they enter the passageway 17 and tilts any cap which enters the passageway with the top face downwardly so as to start the cap turning about a diametric axis as it advances in the top and bottom guide slots 22 and 25.

Figure 4:
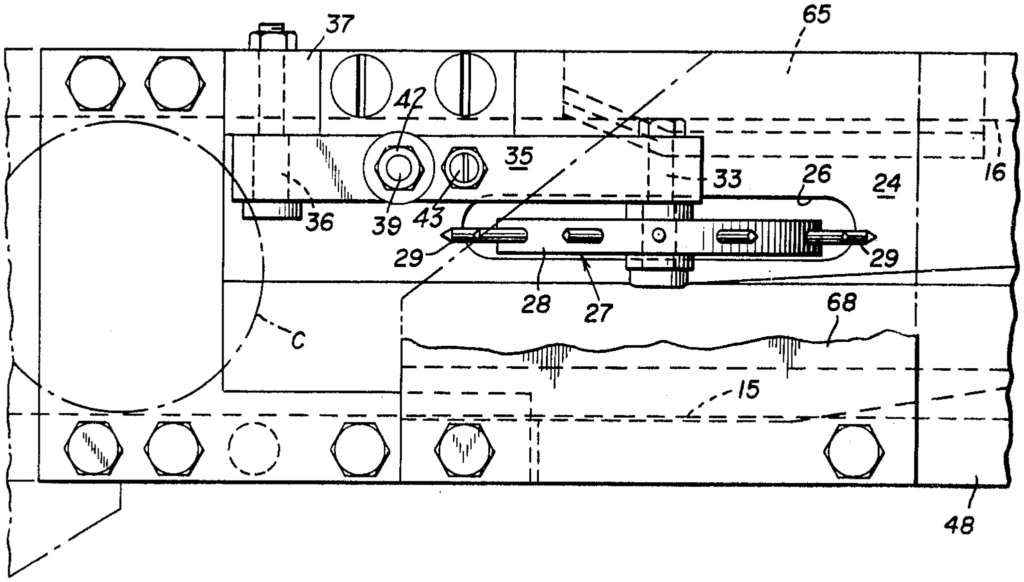
FIGURE 4 is a bottom view, to an enlarged scale, of the pin wheel portion of the chute.

The pin wheel 27 (FIGURES 4 and 5) comprises a circular disc 28 which forms the body thereof and a plurality of pins 29 which are seated in peripherally spaced, outwardly opening radial bores 30 which are of a depth relative to the length of the pins 29 to permit the pins to project a predetermined distance beyond the periphery of the disc 28, the distance being slightly less than the depth of the peripheral skirt S on the cap C. The pins 29 have pointed and slightly blunt outer ends for a purpose which will be described. The disc 28 has a hub portion 31 with a bore 32 for mounting on a short shaft 33. The shaft 33 is formed by a headed pin secured by a threaded end and nut 34 on the free end of a supporting arm 35 which is pivoted at its opposite end at 36 (FIGURE 3) on a bracket 37 depending from the bottom plate member 24. The arm 35 is urged in a counterclockwise direction as viewed in FIGURE 3 to hold the pin wheel 27 in the slot 26 by compression spring 38 mounted on a supporting pin 39 which depends from a mounting block 40 on the bottom plate member 24 and extends through a bore 41 in the arm 35. The free end of the pin 39 is threaded and receives a washer and nut assembly 42 so as to permit adjustment of the compression in the spring 38. A set screw 43 extends through a threaded bore 44 in the arm 35 with its end adapted to engage the lower face of the block 40 so as to limit the movement of the arm 35 and enable the position of the pin wheel 27 to be adjusted.

Figure 5:
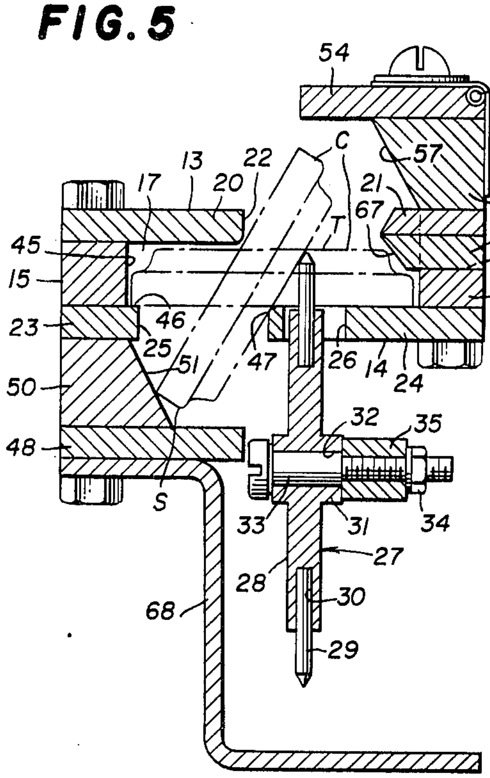
FIGURE 5 is a cross section taken on the line 5—5 of FIGURE 1, to an enlarged scale.

The bottom plate member 23 has its inner edge positioned a sufficient distance inwardly of the vertical face 45 (FIGURE 5) of the guide rail 15 at the pin wheel 27 to provide a ledge 46 for supporting the edge of a cap C which reaches the pin wheel 27 with the top side T uppermost so that the pin wheel 27 does not interfere with the advancing movement of the cap and the cap is supported by the plate members 23 and 24 as it moves past the pin wheel position and continues in the passageway 17 without any orientation or turning. The ledge 46 is sufficiently narrow at the pin wheel position to permit a cap C which reaches this position with its top side T down to be tilted by the pins 29 on the pin wheel 27 so that it pivots about the inner edge 47 of the plate member 24 as a fulcrum at this point with one side of the cap being raised into the slot 22 in the top plate structure 13 and the opposite side of the cap being dropped through the slot 25 in the bottom plate structure 14. A guard plate 48 extends along the one side of the bottom of the chute and is spaced below the bottom plate member 23 by a side guide rail 50 having a downwardly and inwardly sloping inner face 51. The bottom guard plate 48 extends inwardly a sufficient distance to support a cap C which is being turned or oriented as it advances in the slot 25. The side guide rail 50 terminates short of the lower end of the chute as shown in FIGURE 3 and the guard plate 48 is bent upwardly at 52 and has a widened terminal end portion 53 secured directly to the bottom face of the bottom plate member 23 so as to lift the bottom edge of a cap which is being oriented back into the passageway 17. A top guard plate 54 (FIGURES 2, 3 and 5) which is similar to the bottom guard plate 48 and performs a similar function on the top of the chute, is hingedly mounted at 55 along its outermost edge on the top of a side guide rail 56 which is secured on the top surface of the top plate member 21. The guard rail 56 has an upwardly and inwardly tapered inside face 57 and terminates somewhat beyond the middle of the chute structure. The lower end of the guard plate 54 has a downwardly bent portion 58 which extends to a widened and flattened end portion 59 with the latter being notched at 60 and 60' on opposite side edges to receive thumb screws 61 and 61' which serve to lock the plate in position when it is closed over the slot 22 and so as to form a top guide for insuring that the caps do not rise out of the slot 22 as they turn while they advance down the chute. The top plate member 20 is mounted at its upper end on a pivot 62 so that it may be swung laterally of the chute to expose or open the slot 22 and permit access to the chute passageway 17 so as to permit removal of any caps which may for any reason fail to advance in the passageway 17. The plate member 20 is held in its closed or operative position by a latch forming small clamp bar member 63 carried in the form of a nut on the threaded end of an angular pin 64 which is pivotally mounted in the side face of the side guide member 15. A small elongate guide plate 65 (FIGURES 4 and 5) is mounted opposite the pin wheel 27 in a recess 66 in the side guide rail member 16 beneath the plate 21 which has a tapered inner face 67 and which extends into the passageway 17 a sufficient distance to form a guard against upward movement of a cap C which is in the top side uppermost position as it reaches the pin wheel as shown in FIGURE 5, and which may have been slightly deflected upward by the pin wheel contacting the cap skirt or a lug. Thus the face 67 in conjunction with the ledge 46 prevents turning of a cap C as shown with the top T uppermost. An angular plate 68 is mounted on the bottom face of the bottom guide plate 48 at the pin wheel 27 so as to form a guard or shield for protecting the pin wheel.

The chute, which is illustrated, is specifically adapted for handling jar caps of the type illustrated, that is, caps which are characterized by a top panel T and a depending peripheral skirt portion S divided into two sections with the section adjoining the top panel T having a smaller diameter than the thread carrying section along the margins. The caps C are fed to the chute 10 from a suitable hopper 11 or other supply source in a single line with some of the caps having the top panel T uppermost and other caps having the top panel T facing downwardly as the caps enter the chute passageway 17. The caps advance to the pin wheel 27 by gravity or by pressure exerted in the supply line due to the manner in which the caps are supplied. The pin wheel 27 is free to rotate in response to turning force resulting from engagement of the pins 29 with the caps as they move past the slot 26 through which the pins 29 on the wheel project. When a cap C is right side up the open lower face will accommodate the pins 29 and the cap will advance in the passageway 17 in the same position in which it enters the chute, and the wheel 27 will merely rotate without any effect on the cap. When a cap approaches the wheel in the upside down position the pins 29 will engage the outside face of the top panel T and lift the one side of the cap so that the cap pivots around the edge 47 of the slot 25 in the bottom plate structure 14 and is oriented by turning in the guide slots 22 and 25 about an approximately diametrical axis as it advances down the chute. The spring mounting of the pin wheel 27 permits the wheel to yield if the pins 29 strike an unyielding portion of a cap. This may occur under several conditions as illustrated in FIGURES 7, 8 and 9. If the cap is in the upright or proper position so that it cannot be lifted and a pin 29 happens to strike either the leading or trailing edge of the skirt S as illustrated in FIGURE 7 or if the pin strikes the shoulder connecting the two skirt portions as illustrated in FIGURE 8 the shock forces set up are greatly reduced by the yielding of the spring 38 which permits the pin to free itself as the cap advances. If the tip of a pin 29 is caught on a curled edge of one of the lugs or threads the tendency is to push the cap upwardly against the guide forming members 20 and 65 and a resultant force pushes the pin wheel down against the force of the spring 38. If the caps are moving slowly the pin will have time to slide off of the curl so that it will be free to project into the cap by the time the cap has traveled a slight distance and there is no serious force built up. When there is high speed operation, however, the cap and the pin will tend to move much farther during the time required for the pin to slide off and normally a substantial force will build up on the pin. The spring 38 will yield, however, and excessive shock force does not develop before the pin slides free of the curl or lug. If a pin happens to strike between the skirt portions of two adjacent caps as illustrated in FIGURE 9 it will slide up between the caps and force them apart somewhat, the pointed end of the pin being smaller than the space between the cap skirt which results from the off center plane in which the pin operates. As may be clearly seen from FIGURES 4 and 5, the wheel 27 is in a plane off center relative to the path of the caps. During operation of the chute with the caps moving relatively slowly the wheel tends to move against the force of the spring 38 only occasionally when a pin 29 on the wheel 27 hits directly on a lug, the curled edge of the skirt, the land or shoulder directly above the sealing area or in between the skirts on adjacent caps. At high speeds, for example, above a 1000 caps per minute, there is a slight vibration movement of the pin wheel 27 caused by the considerable inertia of the caps that has to be rapidly overcome by the pin wheel in order to lift the upside down caps and start them turning over. The force of the caps against the pin wheel is sufficient to compress the spring slightly with the passage of each upside down cap over the pin wheel. This resilient action tends to cushion the shock on the caps, the guides and the pin wheel and prevents jam-ups of the caps which will occur with a rigidly mounted pin wheel, particularly at high cap speeds. It also causes a smoother flow of the caps. For efficient operation it is necessary to preset the spring 38 to exert a sufficient compressive force so that high speed and the proper quivering action of the pin wheel will be obtained. If there is not enough compressive force exerted by the spring, the upside down caps might not all be lifted sufficiently to start them turning over properly since the pin wheel will be deflected too far downward by the caps. This will usually cause a jam-up since a cap gauging chute portion is normally attached to the outlet end of the chute which prevents the passage of an upside down cap. However, with proper adjustment of the spring pressure, such jam-ups will not occur since all upside down caps will be turned over before they pass through the gauging chute portion.

Preferably, the body 28 of the pin wheel 27 is formed of relatively lightweight material, such as a suitable plastic, so that it has low intertia while the pins 29 are formed of a hard metal which will provide adequate strength and durability over a long period of use.

While particular materials and specific details of construction have been referred to in describing the illustrated form of the invention, it will be understood that other materials and equivalent structural details may be resorted to within the spirit of the invention.

I claim:

1. An apparatus for inverting closure caps of the type having a top panel and a depending peripheral skirt which are improperly positioned, comprising an elongate chute with a passageway of generally rectangular cross section for receiving at one end thereof a line of caps which are in a common plane with the top forming panels in random relation, the passageway being of a size to permit the caps to move freely from one end of the chute to the other end thereof, said chute having oppositely disposed, longitudinally extending guide slots which are disposed relative to the longitudinal axis of the chute to invert caps which are tilted about a diametrical axis as they advance in the chute, a cap position sensing wheel mounted for free rotation on a shaft which extends transversely of the chute and which is resiliently supported adjacent the entrance end of the chute so as to allow the wheel to move in a path towards and from the chute, said wheel having radially extending, spaced pins on the periphery thereof which normally extend into the chute and move in the path of the caps, said wheel being located on one side of the longitudinal axis of the chute so that the pins will project into the open side of a properly positioned cap and not interfere with the advancing movement of the cap in the passageway and the top panel of an improperly positioned cap will be engaged by the pins and the cap tilted about a diametrical axis into said guide slots.

2. In an apparatus as recited in claim 1, and said chute having a top plate structure including plate members which are pivotally mounted so that they may be swung to an inoperative position to provide ready access to said passageway.

3. In an apparatus for inverting closure caps which are moved into a chute in a line and in random relation with some caps facing in one direction and other caps facing in an opposite direction, the chute having spaced oppositely disposed top and bottom walls with longitudinally extending guide slots spaced relative to the longitudinal axis of the chute so as to invert a cap which enters the chute facing in an upward direction and is tilted about a diametrical axis so that opposite edge portions thereof are guided into the slots, a cap position sensing and tilting device comprising a disc-like wheel mounted for rotation on an axis extending transversely of the chute, the peripheral edge of said wheel being resiliently urged in the direction of the chute, said wheel having on its peripheral edge a plurality of spaced, radially extending pins which rotate normally in a path extending into the chute, said wheel being disposed adjacent the entrance end of the chute for operation in a longitudinal plane which is off center relative to the longitudinal axis of the chute whereby a cap which enters the chute facing in an upward direction is engaged on its bottom face by said pins and is tilted so as to bring opposite said portions thereof into said guide slots and a cap which enters the chute facing in the opposite direction clears the pins and moves past said position sensing and tilting device without changing the direction in which it faces.

4. In an apparatus for inverting closure caps which are moved into a passageway in a chute in a line and in random orientation with respect to the direction in which the caps are facing, the passageway being defined by spaced side edge guide members and spaced oppositely disposed walls which the caps face, said walls having longitudinally extending guide recesses spaced relative to the longitudinal axis of the passageway so as to progressively turn a cap which enters the passageway facing in a predetermined direction when the cap is tilted at a position sensing station about a diametrical axis and opposite side portions thereof enter the guide recesses, a position sensing and tilting device at the position sensing station comprising a wheel mounted for free rotation on a resiliently backed axis extending transversely of the longitudinal axis of the passageway, said wheel having on its peripheral edge a plurality of spaced, radially extending pins with pointed ends thereon which rotate in a path having a portion thereof extending into the passageway and in the path of the caps, said wheel being disposed in a longitudinal plane which is off center relative to the longitudinal axis of the passageway and along a recess defining side edge of one side wall whereby a cap which reaches said position sensing station facing in said predetermined position engages said pins and is tilted about said recess defining side edge as a fulcrum to bring opposite edges of the cap into said guide recesses and a cap which is facing in the opposite direction clears the pins and moves past said position sensing and tilting device without any change in the direction in which it faces.

5. In an apparatus for inverting closure caps which are moved into a chute in a line and in random relation with some caps facing in one direction and other caps facing in an opposite direction, the chute having a passageway extending therethrough which is defined by spaced oppositely disposed walls and side edge guide members extending along the side edges of said walls, said walls having longitudinally extending guide slots spaced relative to the longitudinal axis of the chute so as to invert a cap which is facing in a predetermined direction when the cap is tilted about a diametrical axis and opposite edges thereof are lifted into the guide slots, a cap position sensing and tilting device comprising a wheel forming disc mounted for rotation on an axis extending transversely of the passageway, a supporting arm for said wheel, which supporting arm is pivotally mounted and resiliently urged in the direction of said passageway, said wheel having on its peripheral edge circumferentially spaced, radially extending pins with pointed ends thereon which rotate in a path extending into said passageway, said wheel being disposed for rotation in a longitudinal plane which is at one side of the longitudinal axis of the passageway whereby a cap which enters the passageway facing in said predetermined direction engages the ends of said pins and is tilted by the pins so as to bring a side thereof into a guide slot and a cap which enters the passageway facing in the opposite direction moves past the pins without position changing contact therewith.

6. An apparatus for inverting closure caps which are improperly positioned, comprising an elongate chute having a passageway of rectangular cross section for receiving a line of caps which are characterized by a top forming panel and depending skirt formations, the caps being arranged in the passageway with the top forming panel in random relation, the passageway being of a size to permit the caps to move freely therein by gravity when the chute is disposed in a vertical position, said chute having opposed walls with longitudinally extending guide slots which are positioned relative to the longitudinal axis of the chute to cause caps which are tilted to bring opposite edge portions into the slots to rotate about a diametrical axis so as to be inverted as they advance in the chute, a position sensing wheel associated with the chute, which wheel has radially extending, circumferentially spaced pins on its periphery, a supporting arm for said position sensing wheel which is pivotally mounted at one end on said chute, means rotatably supporting the wheel at the other end of said supporting arm, spring means for urging the wheel into a position where the pins thereon extend into the cap receiving passageway, and stop means for limiting the movement of the wheel supporting arm so as to adjust the normal position of the wheel, said wheel being located on one side of the longitudinal axis of the passageway so that the pins will project into the open side of a cap which advances in the passageway with its open side towards said wheel and permit the cap to move past said wheel without any interference while a cap which advances in the passageway with its topside toward said wheel will engage the pins and be tilted into said guide slots.

References Cited by the Examiner

UNITED STATES PATENTS

| | | | |
|---|---|---|---|
| 2,270,713 | 1/1942 | Belada. | |
| 2,400,419 | 5/1946 | Hohl et al. | 193—43 |
| 2,665,005 | 1/1954 | Mundy | 193—43 X |
| 3,029,918 | 4/1962 | Stover | 193—43 |
| 3,095,957 | 7/1963 | Roberts et al. | 193—43 |

FOREIGN PATENTS

| | | | |
|---|---|---|---|
| 453,052 | 11/1927 | Germany. | |

EVON C. BLUNK, *Primary Examiner.*

SAMUEL F. COLEMAN, *Examiner.*

A. LEVINE, *Assistant Examiner.*